(12) United States Patent
Fukuzawa et al.

(10) Patent No.: US 6,642,349 B1
(45) Date of Patent: Nov. 4, 2003

(54) BATCH TYPE APPARATUS FOR PRODUCTION OF LIQUID CRYSTALLINE POLYMER, AND METHOD FOR CONTINUOUS PRODUCTION OF LIQUID CRYSTALLINE POLYMER USING THE APPARATUS

(75) Inventors: Haruyuki Fukuzawa, Fuji (JP); Toshio Shiwaku, Fuji (JP)

(73) Assignee: Polyplastics Co., Ltd., Osaka (JP)

( * ) Notice: Subject to any disclaimer, the term of this patent is extended or adjusted under 35 U.S.C. 154(b) by 581 days.

(21) Appl. No.: 09/660,332

(22) Filed: Sep. 12, 2000

(30) Foreign Application Priority Data

Sep. 13, 1999 (JP) ............................................ 11-259231

(51) Int. Cl.$^7$ .................................................. C08F 6/00
(52) U.S. Cl. ........................ 528/480; 528/176; 528/190; 528/191; 528/192; 528/271; 528/272; 528/193; 528/194
(58) Field of Search ................................ 528/176, 190, 528/193, 191, 192, 194, 271, 272, 480

(56) References Cited

FOREIGN PATENT DOCUMENTS

JP          06-192403          12/1992

*Primary Examiner*—Terressa M. Boykin
(74) *Attorney, Agent, or Firm*—Nixon & Vanderhye P.C.

(57) ABSTRACT

A batch type apparatus for producing a liquid crystalline polymer includes a reactor, a first gas-pressurizing unit, a die-head, a shut-off valve, and a die-plate. The reactor produces a liquid crystalline polymer capable of forming an anisotropic melt phase. The reactor has a discharge port at a lower portion thereof. The first gas-pressurizing unit is attached to the reactor for discharging under pressure the liquid crystalline polymer by use of an inert gas. The die-head includes, at one end portion thereof, a discharge valve which opens and closes the discharge port; at a middle portion thereof, an internal chamber which communicates with the discharge port and is heated and regulated from the peripheral surface thereof; and at the other end portion thereof, an opening which forms an end portion of the internal chamber. The shut-off valve is connected to the other end portion of the die-head and capable of opening and closing the opening. The die-plate is disposed at the opening of the shut-off valve.

8 Claims, 3 Drawing Sheets

BATCH TYPE APPARATUS FOR PRODUCTION OF LIQUID CRYSTALLINE POLYMER, AND METHOD FOR CONTINUOUS PRODUCTION OF LIQUID CRYSTALLINE POLYMER USING THE APPARATUS

BACKGROUND OF THE INVENTION

1. Field of the Invention

The present invention relates to an apparatus for batch production of a liquid crystalline polymer and to a method for continuous production of a liquid crystalline polymer using the apparatus. More particularly, the present invention relates to an apparatus for batch production of a liquid crystalline polymer, such as an aromatic polyester resin or an aromatic polyester amide resin, which tends to be oxidized or deteriorated when heated in the air, as well as to a method for continuous production of a liquid crystalline polymer using the apparatus.

2. Description of the Related Art

Conventionally, an optically anisotropic liquid crystalline polymer, such as an aromatic polyester resin or an aromatic polyester amide resin, is produced in the following manner by use of an apparatus for batch production as shown in FIG. 5. A liquid crystalline polymer is formed through reaction effected within a reactor 1 shown in FIG. 5. The thus-formed viscous polymer is discharged under pressure through a die-plate 3 having a number of holes 4 formed therein and attached to the bottom end of a die-head 2, which, in turn, is attached to a lower portion of the reactor 1. Passing through the holes formed in the die-plate 3, the viscous polymer is discharged in the form of strands 5, which are then cut into pellets having a predetermined size.

The die-head 2 includes a discharge valve 6 attached to the bottom portion of the reactor 1 and adapted to open/close a discharge port 1a, through which a viscous polymer is discharged; a jacket 8 having a polymer chamber 7 formed therein so that the viscous polymer is uniformly distributed over the die-plate 3 attached to the bottom end thereof, and allowing a heat-insulating fluid to flow along the outer wall thereof; and the die-plate 3 attached to the bottom end of the jacket 8. In this manner, the die-head 2 forms a discharge path 9 for the viscous polymer.

However, the following problem is involved in continuous production of a liquid crystalline polymer in batches using the above-mentioned apparatus for batch production of a liquid crystalline polymer (as used herein, the term "continuous" in "continuous production" means that an intermediate step, such as washing and drying, is not involved between production of one batch and production of the next batch). Since the die-plate 3 is attached directly to the jacket 8 of the die-head 2, after discharge of one batch of liquid crystalline polymer, a portion of the produced liquid crystalline polymer remains at, for example, a narrow portion 9a of the discharge path 9; i.e., a portion defined by the end of the discharge valve 6 and the inner wall of the polymer chamber 7 of the die-head 2. As a result, yield of pellets decreases.

Also, upon coming into contact with the air which enters the polymer chamber 7 through the holes 4 formed in the die-plate 3, the residual liquid crystalline polymer is oxidized or deteriorated; for example, discolors or carbonizes. When the next batch of liquid crystalline polymer is discharged, the deteriorated liquid crystalline polymer may clog the holes 4 formed in the die-plate 3, may disturb uniform formation of strands, may mingle in strands in the form of black specks causing impairment in quality, or may force interruption of cutting of strands when a lump thereof is caught by a cutter.

Accordingly, the conventional continuous production process of a liquid crystalline polymer using a batch type apparatus requires a lot of time and labor for removal of the above-mentioned residual liquid crystalline polymer; i.e., cleaning of the polymer chamber 7, or removal of oxidized, deteriorated, discolored and carbonized liquid crystalline polymer, resulting in a great decrease in production efficiency.

Japanese Patent Application Laid-Open (kokai) No. 192403/1994 discloses a method for continuous batch polymerization of a liquid crystalline polyester. According to the disclosed method, a polymer melt is discharged from a polymerizer such that the amount of residual polymer melt is not greater than 30 kg per cubic meter of internal volume of the polymerizer, followed by charge of material for production of the next batch. Since the residual polymer decreases the effective internal volume of the polymerizer available for polymerization, the utilization efficiency of the polymerizer is reduced accordingly. Also, it may happen that the melting point of the residual polymer increases, and the resultant residual polymer may migrate into the next batch of polymer, causing impairment in quality. Also, the migration of the residual polymer into the next batch of polymer disturbs smooth discharge of polymer.

SUMMARY OF THE INVENTION

An object of the present invention is to provide an apparatus for batch production of a liquid crystalline polymer capable of preventing oxidation or deterioration of residual liquid crystalline polymer in a certain batch to thereby prevent potential clogging of a die with deteriorated residual liquid crystalline polymer in the course of discharge of the next batch of liquid crystalline polymer, with a resultant improvement in productivity or yield, and to thereby improve the quality of liquid crystalline polymer discharged therefrom, as well as to provide a method for continuous production of a liquid crystalline polymer using the apparatus.

Accordingly, the present inventors have intensively studied the mechanisms of oxidation and deterioration of residual liquid crystalline polymer present in a polymer chamber of a die-head, characteristics of various kinds of liquid crystalline polymers, the structure and oxygen shutoff mechanisms of the die-head, the installation position, shape and structure of a slit valve, and the relative timing of operation of the slit valve and a discharge valve, among other factors, thereby achieving the present invention.

The present invention provides a batch type apparatus for producing a liquid crystalline polymer, comprising: a reactor for producing a liquid crystalline polymer capable of forming an anisotropic melt phase, the reactor having a discharge port at a lower portion thereof; a first gas-pressurizing means attached to the reactor for discharging under pressure the liquid crystalline polymer by use of an inert gas; a die-head including, at one end portion thereof, a discharge valve which opens and closes the discharge port, at a middle portion thereof, an internal chamber which communicates with the discharge port and is heated and regulated from the peripheral surface thereof, and at the other end portion thereof, an opening which forms an end portion of the internal chamber; a shut-off valve connected to the other end portion of the die-head and capable of opening and closing the opening; and a die-plate disposed at the opening of the shut-off valve.

Preferably, in the batch type apparatus according to the present invention, the shut-off valve is a slit valve which has a plurality of holes capable of establishing communication between the opening side and the die-plate side and which shuts off the opening side from the atmospheric air when closed.

Preferably, in the batch type apparatus according to the present invention, the die-head has a pressurized gas inlet at an upper portion of the internal chamber and the pressurized gas inlet is connected to a second gas-pressurizing means which supplies an inert gas.

The present invention further provides a method for continuously producing a liquid crystalline polymer using the batch type apparatus according to the present invention, the method comprising the steps of: opening the shut-off valve and the discharge valve after completion of formation of the liquid crystalline polymer in the reactor, and discharging the polymer outward via the die-head and the die-plate, while pressurizing the polymer in the reactor by use of the inert gas fed from the first gas-pressurizing means; conducting an operation for stopping discharge of the liquid crystalline polymer, after completion of discharge of the liquid crystalline polymer, so as to close the shut-off valve and the discharge valve while discharging the inert gas; when a predetermined period of time has elapsed and a liquid crystalline polymer formed in the next batch is to be discharged, opening again the shut-off valve and the discharge valve, while pressurizing the polymer in the reactor by use of the inert gas fed from the first gas-pressurizing means, to thereby conduct an operation for starting discharge of the polymer outward through the die-head and the die-plate; and repeating, for a prescribed number of times, the above-mentioned series of operations for discharging of the polymer, stopping discharge of the polymer, and starting discharge of the polymer.

The sequence of opening the shut-off valve and the discharge valve is not particularly limited. For example, (1) the shut-off valve is first opened, and then the discharge valve is opened, (2) the discharge valve is first opened, and then the shut-off valve is opened, or (3) the shut-off valve and the discharge valve are opened substantially concurrently. When the withstand pressure of the shut-off valve is low, method (1) or (3) is preferred. Similarly, the sequence of closing the shut-off valve and the discharge valve is not particularly limited. For example, (4) the shut-off valve is first closed, and then the a discharge valve is closed, (5) the discharge valve is first closed, and then the shut-off valve is closed, or (6) the shut-off valve and the discharge valve are closed substantially concurrently. When the withstand pressure of the shut-off valve is low, method (5) or (6) is preferred. The same is applied to the remainder of the description appearing in this section.

The present invention further provides another method for continuously producing a liquid crystalline polymer using the batch type apparatus according to the present invention, the method comprising the steps of: opening the shut-off valve and the discharge valve after completion of formation of the liquid crystalline polymer in the reactor, and discharging the polymer outward via the die-head and the die-plate, while pressurizing the polymer in the reactor by use of the inert gas fed from the first gas-pressurizing means; conducting an operation for stopping discharge of the liquid crystalline polymer, after completion of discharge of the liquid crystalline polymer from the reactor, so as to close the shut-off valve and the discharge valve while discharging the inert gas; starting formation of a liquid crystalline polymer of the next batch in the reactor after the discharge valve is closed, and, after elapse of a required period of time, introducing under pressure the inert gas from the second gas-pressurizing means into the internal chamber of the die-head via a gas inlet formed at an upper portion of the internal chamber of the die-head, opening the shut-off valve so as to discharge the polymer in the die-head and the shut-off valve, and then closing again the shut-off valve while discharging the inert gas outward, thereby conducting an operation of stopping discharge of the polymer in the die-head; when a predetermined period of time has elapsed and a liquid crystalline polymer formed in the next batch is to be discharged, opening again the shut-off valve and the discharge valve, while pressurizing the polymer in the reactor by use of the inert gas fed from the first gas-pressurizing means, to thereby conduct an operation for starting discharge of the polymer outward through the die-head and the die-plate; and repeating, for a prescribed number of times, the above-mentioned series of operations for discharging of the polymer, stopping discharge of the polymer, stopping discharge of the polymer in the die-head, and starting discharge of the polymer of the next batch.

In the methods according to the present invention, the liquid crystalline polymer may be an aromatic polyester resin or an aromatic polyester amide resin.

In the methods according to the present invention, the liquid crystalline polymer may be an aromatic polyester amide resin being composed of p-hydroxy benzoic acid, 6-hydroxy-2-naphthoic acid, 4,4'-dihydroxy biphenyl, terephthalic acid, and p-aminophenol, as constitutional monomer components.

In the methods according to the present invention, the liquid crystalline polymer is an aromatic polyester resin being composed of p-hydroxy benzoic acid, and 6-hydroxy-2-naphthoic acid, as constitutional monomer components.

Through employment of the shut-off valve and through combination of shut-off valve operation, discharge valve operation, and discharge of an inert gas, the amount of residual liquid crystalline polymer is decreased greatly, and oxidation or deterioration, such as discoloration or carbonization, of the residual liquid crystalline polymer can be prevented.

Thus, discharge of a certain batch of liquid crystalline polymer does not encounter clogging of the die plate with residual liquid crystalline polymer of the preceding batch. Also, quality and yield of a produced liquid crystalline polymer can be improved. Further, since continuous production can be carried out without performance of cleaning in the middle, the cycle time of production can be shortened, and production efficiency can be improved.

Through employment of the pressurized gas inlet formed at an upper portion of the internal chamber of the die-head, and the gas-pressurizing means for supply of a pressurized inert gas to the pressurized gas inlet, production of the second batch can be immediately started upon completion of discharge of the first batch of the liquid crystalline polymer from the reactor, thereby further improving production efficiency.

Through introduction of a pressurized inert gas into the upper portion of the internal chamber of the die-head through the pressurized gas inlet, residual liquid crystalline polymer present in the die-head and die-plate can be free of oxidation or deterioration, such as discoloration or carbonization, thereby improving quality and yield of a liquid crystalline polymer.

BRIEF DESCRIPTION OF THE DRAWINGS

FIGS. 2A and 2B are view showing a main portion of the apparatus of FIG. 1, wherein FIG. 2A is a sectional view of the main portion, and FIG. 2B is a bottom view of a die-plate;

DESCRIPTION OF THE INVENTION AND PREFERRED EMBODIMENTS

A liquid crystalline polymer is a polymer capable of exhibiting optical anisotropy; for example, an aromatic polyester resin or an aromatic polyester amide resin. Specifically, preferred liquid crystalline polymers include aromatic polyester amide resins which contain as constitutional monomer components p-hydroxybenzoic acid, 6-hydroxy-2-naphthoic acid, 4,4'-dihydroxy biphenyl, terephthalic acid, and p-aminophenol; aromatic polyester resins which contain as constitutional monomer components p-hydroxybenzoic acid and 6-hydroxy-2-naphthoic acid; and aromatic polyester resins which contain as constitutional monomer components p-hydroxy benzoic acid, 6-hydroxy-2-naphthoic acid, and 4,4'-dihydroxy biphenyl.

An inert gas is not particularly limited, so long as it does not cause oxidation or deterioration of a liquid crystalline polymer. Examples of such an inert gas include nitrogen gas, carbon dioxide gas, and argon gas. Notably, nitrogen gas is preferred.

Figure 1:
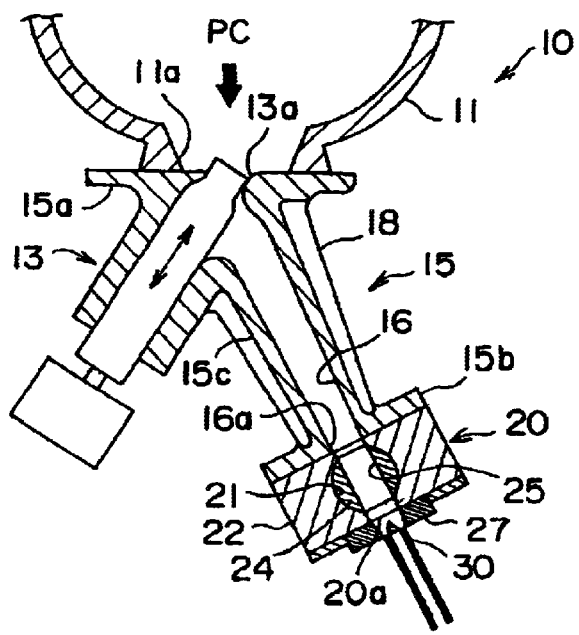
FIG. 1 is a partially sectional view of an apparatus for batch production of a liquid crystalline polymer used in Example 1 of the present invention.
Figure 2A:
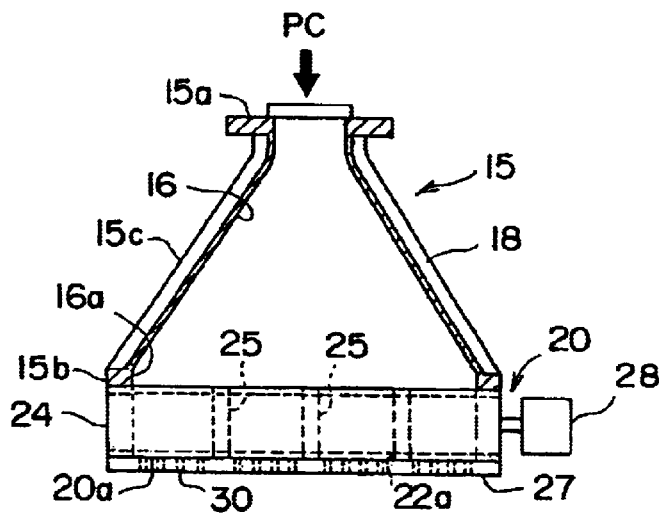
Figure 2B:
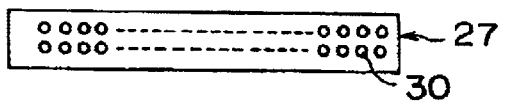

A shut-off valve is adapted to open/close a bottom opening of an internal chamber formed in a die-head and serving as a flow path for a liquid crystalline polymer. The shut-off valve is preferably a slit valve. As shown in FIGS. 1 and 2, a slit valve 20 includes a valve shell 22 and a valve body 24. The valve shell 22 is integrally disposed at the portion of an opening 16a of a die-head 15 and has a cylindrical cavity 21 formed therein. Assuming the form of a cylinder, the valve body 24 is fitted into the cavity 21 in a slidably rotatable manner. A plurality of holes 25 are formed in the valve body 24 in such a manner as to extend perpendicular to the axis of rotation of the valve body 24. Preferably, the cross section of the hole 25 assumes the shape of an elongated ellipse.

When the valve body 24 is rotated such that the holes 25 are aligned with the opening 16a, the slit valve 20 establishes communication between the opening 16a and a die-plate 27 by means of the holes 25. When the valve body 24 is then rotated 90 degrees so as to close the opening 16a, the interior of the die-head 15 is completely shut off from the outside air.

The shut-off valve is not particularly limited, so long as the following conditions are satisfied: the shut-off valve is integrally disposed at the other end portion of the die-head so as to open/close the opening formed in the other end portion; when the shut-off valve opens the opening, communication is established between the opening of the die-head and the die-plate by means of the holes; and when the shut-off valve closes the opening, the interior of the die-head is completely shut off from the outside air. For example, the shut-off valve may assume any of the following forms: a plate-like valve body is slid in a radial or axial direction of the shut-off valve; a cylindrical valve body is rotated in a sliding manner as mentioned above; and a solid plate-like valve body or a solid cylindrical valve body having no hole or anything else is slid.

As mentioned above, the shut-off valve is integrally disposed at an opening portion located at the other end portion of the die-head. However, the present invention is not limited thereto. For example, the shut-off valve may be attached to the opening portion by means of bolts while being sealed against the same by means of packing.

Figure 4:
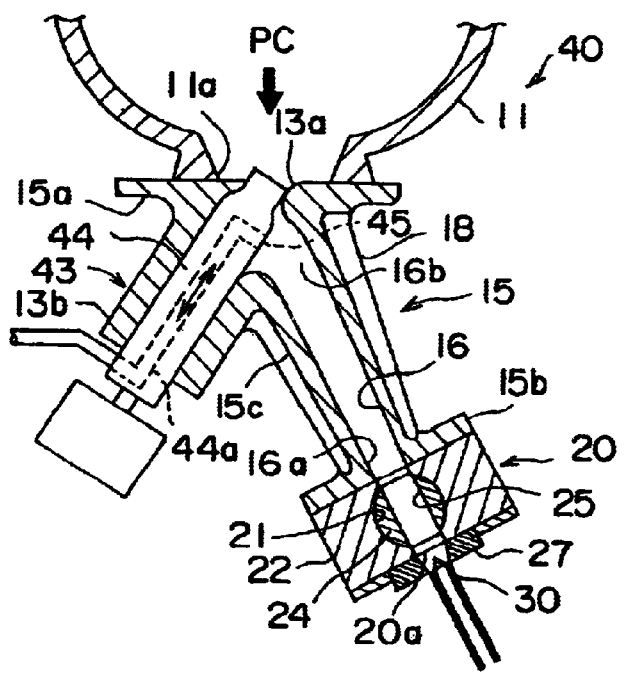
FIG. 4 is a partially sectional view of an apparatus for batch production of a liquid crystalline polymer used in Example 3 of the present invention.

A pressurized gas inlet which opens to an upper portion of the internal chamber of the die-head may be located on a wall of the internal chamber or on a peripheral surface of an upper portion of a piston of a discharge valve as shown in FIG. 4, so long as a pressurized inert gas can be supplied toward the upper portion of the internal chamber.

The pressurized gas inlet may be connected to second gas-pressurizing means so as to supply a pressurized inert gas into the internal chamber of the die-head from the second gas-pressurizing means. The second gas-pressurizing means may be provided separately from first gas-pressurizing means, or the first gas-pressurizing means may serve as combination first-second gas-pressurizing means.

When the first gas-pressurizing means serves as combination first-second gas-pressurizing means, it is preferable that there be disposed a 3-way valve for switching destination of an inert gas between a reactor and the pressurized gas inlet, and a controller for controlling timing of this switching operation and timing of start and stop of supply of the inert gas. Control items of the controller depend on a liquid crystalline polymer to be produced and an apparatus for batch production to be used.

In the invented method for continuous production of a liquid crystalline polymer, the starting of the supply of a pressurized inert gas into the internal chamber of the die-head through the pressurized gas inlet after closing of the discharge valve after discharge of a liquid crystalline polymer from the reactor may be performed after the time (the required period of time) that residual liquid crystalline polymer on the wall of the internal chamber has move down to a bottom portion of the internal chamber. Alternatively, the supply of a pressurized inert gas into the internal chamber is performed after completion of charging of material for production of the next batch into the reactor and polymerization thereof. Specifically, the required period of time is 10 minutes to 60 minutes, preferably about 30 minutes.

In the invented method for continuous production of a liquid crystalline polymer, discharge of a liquid crystalline polymer from the reactor means establishment of a state in which almost all the liquid crystalline polymer is discharged from the reactor (there may be a portion of the liquid crystalline polymer moving downward on the inner wall of the reactor), permitting start of so-called nitrogen gas purge.

Batch production of a liquid crystalline polymer by use of the conventional apparatus proceeds in the following manner. The first batch of liquid crystalline polymer is discharged through the die-head and die-plate in the form of strands. Then, residual liquid crystalline polymer is removed from inside the die-head. The interior of the reactor and the interior of the die-head are cleaned and dried. Subsequently, material for production of the next batch is charged into the reactor, followed by repeating production of the same batch.

According to the present invention, a pressurized inert gas is supplied into the die-head which is shut off from the outside air by means of the shut-off valve, without removal of residual liquid crystalline polymer, so as to prevent oxidation or deterioration of the residual liquid crystalline polymer. As a result, there is prevented potential clogging of a die with liquid crystalline polymer in the course of discharge of the next batch of liquid crystalline polymer, thereby improving productivity or yield. Also, the quality of produced liquid crystalline polymer is improved.

EXAMPLES

The present invention will next be described in detail by way of example, which should not be construed as limiting the invention.

Example 1

Figure 3:
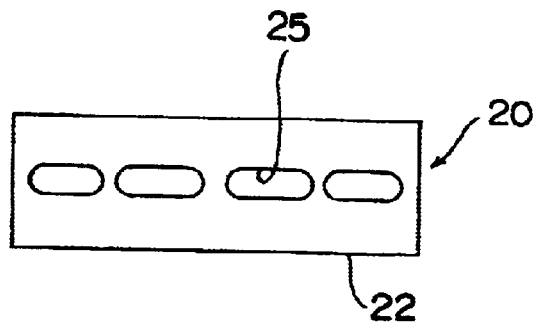
FIG. 3 is a bottom view of a slit valve shown in FIG. 2, used in the apparatus of FIG. 1.

An apparatus for batch production of a liquid crystalline polymer used in Examples 1 and 2 of the present invention will be described with reference to FIGS. 1 to 3.

In FIG. 1, reference numeral 10 denotes an apparatus for batch production of a liquid crystalline polymer of the present invention. The apparatus 10 for batch production of a liquid crystalline polymer includes a reactor 11, an unillustrated first nitrogen gas feeder serving as first gas-pressurizing means, and a die-head 15. The reactor 11 includes an unillustrated stirrer, a distillation pipe, and a discharge port 11a at the lower portion of the reactor 11, and generates a liquid crystalline polymer capable of assuming an anisotropic melt phase. The first nitrogen gas feeder is attached to the reactor 11 and supplies nitrogen gas, which is an inert gas, into the reactor 11 so as to discharge a liquid crystalline polymer under pressure from the reactor 11. One end portion 15a of the die-head 15 is attached to the discharge port 11a located at a bottom portion of the reactor 11. The die-head 15 includes a discharge valve 13 for opening/closing the discharge port 11a.

The die-head 15 has an internal chamber 16 serving as a flow path for a liquid crystalline polymer. The internal chamber 16 communicates with the discharge port 11a and with a valve seat hole 13a of the discharge valve 13 at the one end portion 15a. As shown in FIG. 2A, the die-head 15 fans out from the one end portion 15a toward the other end portion 15b of the die-head 15 and has a rectangular opening 16a formed at the other end portion 15b.

A heater 18 is disposed at a middle portion 15c of the die-head 15 and adapted to heat the internal chamber 16 from outside so as to regulate the temperature of the internal chamber 16. Examples of the heater 18 include a jacket for circulating a high-temperature fluid (e.g., oil) and an electric heater.

The heater 18 maintains the temperature of the internal chamber 16 at 350° C. in the course of discharge of a liquid crystalline polymer from the reactor 11 and at 200° C. after the discharge is completed. When discharge of a liquid crystalline polymer from the reactor 11 resumes, the heater 18 raises the temperature of the internal chamber 16 to 350° C.

A slit valve 20 serving as a shut-off valve is integrally disposed at the other end portion 15b of the die-head 15 while being connected to the opening 16a. The slit valve 20 has a plurality of slit-like holes 25 formed therein.

A rectangular die-plate 27 is attached to a lower side of the slit valve 20 while being in contact with openings 20a of the slit valve 20.

Alternatively, the die-plate 27 is removably attached to the other end portion 15b of the die-head 15. The slit valve 20 is disposed on the die-plate 27 so as to face the infernal chamber 16, thereby opening/closing the opening 16a of the internal chamber 16.

The slit valve 20 includes a valve shell 22 and a valve body 24. As shown in FIG. 3, the valve shell 22 has four axially arranged, elongated elliptic holes 22a (not shown) and a cylindrical cavity 21 formed therein. Assuming the form of a cylinder, the valve body 24 is fitted into the cavity 21 in a slidably rotatable manner.

Preferably, the valve body 24 has four slit-like holes 25 formed therein in such a manner as to extend therethrough perpendicular to the axis of rotation thereof. The holes 25 are formed in such a manner as to align with the holes 22a formed in the valve shell 22 as the valve body 24 rotates. Reference numeral 28 denotes a handle for rotating the valve body 24 to thereby open/close the slit valve 20.

When the valve body 24 is rotated so as to open the opening 16a such that the holes 25 are aligned with the opening 16a, the slit valve 20 establishes communication between the opening 16a and the die-plate 27 by means of the holes 25. When the valve body 24 is then rotated 90 degrees so as to close the opening 16a, the interior of the die-head 15 is completely shut off from the outside air.

Die holes 30 are formed in the die-plate 27 in such a manner as to be spaced from each other in the longitudinal direction of the die-plate 27, and are adapted to discharge a liquid crystalline polymer therethrough in the form of strands.

Next will be described a method for continuous production of a liquid crystalline polymer using the apparatus 10 for batch production (see Table 1).

In order to start production of the first batch, material for production of a liquid crystalline polymer was charged into the reactor 11. The material was a mixed melt of p-acetoxy benzoic acid (1,655 g), 6-acetoxy-2-naphthoic acid (340 g), 4-acetoamidephenol (159 g), 4,4'-diacetoxy biphenyl (554 g), and terephthalic acid (477 g). The mixed melt had a temperature of 200° C.

The temperature of the mixed melt was increased from 200° C. to 340° C. over a period of time of about 3 hours, while acetic acid was distilled off. When the temperature of the mixed melt reached 340° C., the pressure of the reactor 11 was gradually reduced to 10 mmHg or lower.

The stirrer was kept stirring the mixed melt until the torque of the stirrer reached a predetermined value, which indicates formation of a liquid crystalline polymer, in this case, a polyester amide resin (hereinafter, may be called an A polymer). While nitrogen gas was supplied into the reactor 11 from the first nitrogen gas feeder so as to apply pressure to the liquid crystalline polymer within the reactor 11, the slit valve 20 was opened, and then the discharge valve 13 located at the bottom portion of the reactor 11 was opened, thereby starting to discharge the liquid crystalline polymer through the die-head 15 and the die-plate 27, in the form of strands. That is, a process for starting discharge of a liquid crystalline polymer was carried out. The thus-discharged strands were pelletized.

After the liquid crystalline polymer was discharged from the reactor 11, while nitrogen gas was allowed to keep flowing out through the die holes 30 formed in the die-plate 27; i.e., while nitrogen gas purge was continued, the slit valve 20 and the discharge valve 13 were closed. That is, a process for ending discharge of a liquid crystalline polymer was carried out.

Subsequently, the apparatus was allowed to stand for a predetermined period of time after discharge of the liquid crystalline polymer, thereby allowing residual liquid crystalline polymer present on the inner wall of the reactor 11, and close to the discharge port 11a, or a narrow portion of the flow path in the die-head 15 and on the inner wall of the die-head 15 to move downward and accumulate by its own weight to the bottom portion of the reactor 11 and to the slit valve 20, respectively. Again, the operation for discharging a liquid crystalline polymer was performed so as to discharge the residual liquid crystalline polymer accumulated at the bottom portion of the reactor 11 and at the slit valve 20, thereby greatly decreasing the amount of residual liquid crystalline polymer within the reactor 11 and the die-head 15. This additional discharge operation is not essential to the invention, but was carried out in the present example (the apparatus was allowed to stand for about 30 minutes.)

According to the present invention, discharge of a liquid crystalline polymer ends by closing the slit valve, so that the die-head is filled with nitrogen gas, thereby shutting off the interior of the die-head from the outside air. Thus, even when some liquid crystalline polymer remains within the die-head, the residual liquid crystalline polymer is free from oxidation or deterioration, such as discoloration or carbonization.

Production of the second batch was carried out in the following manner. As in the case of production of the first batch, the mixed melt serving as material for production of a liquid crystalline polymer and having a temperature of 200° C. was charged into the reactor 11. Removal of acetic acid, temperature control, and reduction of pressure were carried out in a manner similar to that in production of the first batch.

After the elapse of a predetermined period of time, the second batch of liquid crystalline polymer was formed. Starting discharge of the second batch of liquid crystalline polymer was carried out in the following manner. Again, while nitrogen gas was supplied into the reactor 11 from the first nitrogen gas feeder so as to apply pressure to the liquid crystalline polymer contained in the reactor 11, the slit valve 20 was opened, and then the discharge valve 13 was opened, thereby starting discharging the liquid crystalline polymer through the die-head 15 and the die-plate 27.

A series of operations described above a process for discharging a liquid crystalline polymer, a process for ending discharge of a liquid crystalline polymer, and a process for starting discharge of a liquid crystalline polymer was repeated by a predetermined number of times (3 times). The yield of pellets (average) was 98.6% with respect to the amount of the charged material monomers. The number of black specks (hereinafter called BS) was an average of 3.5 per 15 g of pellets. BS's were counted in the following manner. A liquid crystalline polymer (5 g) was pressed into a thin disk at a temperature of 340° C. The disk was visually observed under transmitted light to thereby count BS's.

In production of the second batch of liquid crystalline polymer, since residual liquid crystalline polymer present in the die-head 15 was very small in amount and free of oxidation or deterioration, discharge of the liquid crystalline polymer was able to be started immediately after formation of the liquid crystalline polymer. Since an intermediate process, such as cleaning of the interior of the die-head 15, was not required after discharge of a liquid crystalline polymer, a cycle time of production of a liquid crystalline polymer was shortened. Thus, production efficiency was improved greatly.

Discharge of the second batch of liquid crystalline polymer is started in the following manner. While nitrogen gas is supplied into the reactor 11 so as to apply pressure to the liquid crystalline polymer formed in the reactor 11, the slit valve 20 is opened, and then the discharge valve 13 is opened so as to discharge the liquid crystalline polymer through the die-head 15 and the die-plate 27. Even when the die-head 15 contains residual liquid crystalline polymer, which is free of oxidation or deterioration, the residual liquid crystalline polymer is discharged together with nitrogen gas when the slit valve 20 is opened. Thus, the residual liquid crystalline polymer hardly mingles with the second batch of liquid crystalline polymer, so that the second batch of liquid crystalline polymer discharged in the form of strands through the die-plate 27 exhibits high quality.

The above-described operations were repeated for each batch, whereby liquid crystalline polymer pellets of high quality were able to be produced at high yield.

Example 2

A liquid crystalline polymer was produced in a manner similar to that of Example 1 except that p-acetoxy benzoic acid was added in an amount of 2,165 g, and 6-acetoxy-2-naphthoic acid was added in an amount of 1,023 g. Hereinafter, the obtained liquid crystalline polymer may be called a B polymer.

The yield of pellets was 98.0%, and the number of BS's was an average of 4.5.

Comparative Example 1

Figure 5:
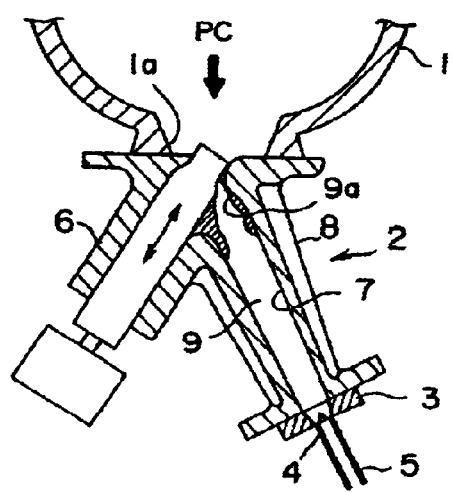
FIG. 5 is a partially sectional view of a conventional apparatus for batch production of a liquid crystalline polymer.

A liquid crystalline polymer was produced in a manner similar to that of Example 1 except that the conventional apparatus, which is not equipped with a slit valve, shown in FIG. 5 was used and that nitrogen gas purge was not carried out.

The yield of pellets was 95.9%, and the number of BS's was an average of 5.0.

Comparative Example 2

A liquid crystalline polymer was produced in a manner similar to that of Example 1 except that after completion of discharge of the first batch of liquid crystalline polymer, nitrogen gas purge was not carried out, and the slit valve was left opened.

The yield of pellets was 95.9%, and the number of BS's was an average of 5.0.

Comparative Example 3

A liquid crystalline polymer was produced in a manner similar to that of Example 2 except that a conventional reactor not equipped with a slit valve was used and that nitrogen gas purge was not carried out.

The yield of pellets was 93.4%, and the number of BS's was an average of 9,0.

As seen from comparison of test results between Example 1, which employed the method and apparatus of the present invention, and Comparative example 1, which employed the conventional method and apparatus, the method and apparatus of the present invention do not involve oxidation or deterioration of residual liquid crystalline polymer present in the die-head and bring a great reduction in the number of BS's and a great improvement in yield of liquid crystalline polymer. These effects are yielded by virtue of the following features of the present invention: nitrogen gas purge is carried so as to minimize residual liquid crystalline polymer present in the die-head; and the slit valve and the discharge valve are closed so as to fill the die-head with nitrogen gas against entry of the outside air into the die-head.

As seen from comparison of test results between Example 1 and Comparative example 2, execution of nitrogen gas purge and closing of the slit valve contribute greatly to improvement in yield and quality of liquid crystalline polymer.

As seen from comparison of test results between Example 2, which employed the method and apparatus of the present invention, and Comparative example 3, which employed the conventional method and apparatus, the method and apparatus of the present invention bring a great reduction in the number of BS's and a great improvement in yield of liquid crystalline polymer even in the case of production of a different kind of liquid crystalline polymer.

TABLE 1

Comparison of Production between Apparatus Equipped with Slit Valve and Conventional Apparatus

| | | Conditions of Production | | Yield and Quality | |
|---|---|---|---|---|---|
| | Polymer | State of slit valve during interval between discharges | Nitrogen gas purge | Yield (%) | BS |
| Example 1 | A | Closed | Yes | 98.6 | 3.5 |
| Example 2 | B | Closed | Yes | 98.0 | 4.5 |
| Comparative example 1 | A | Slit valve not provided | No | 95.9 | 5.0 |
| Comparative example 2 | A | Opened | No | 95.9 | 5.0 |
| Comparative example 3 | B | Slit valve not provided | No | 93.4 | 9.0 |

Example 3

An apparatus for batch production of a liquid crystalline polymer used in Example 3 of the present invention will be described with reference to FIG. 4.

In FIG. 4, reference numeral 40 denotes an apparatus for batch production of a liquid crystalline polymer of the present invention. Except for a discharge valve 43, features of the apparatus 40 for batch production of a liquid crystalline polymer are similar to those of Example 1 and are denoted by common reference numerals. Description of these similar features is omitted.

The discharge valve 43 of the apparatus 40 for batch production includes a piston 44 for opening/closing the valve seat hole 13a and a cylinder portion 13b for holding the piston 44, which moves axially. A pressurized gas inlet is located at an upper portion of the piston 44 and opens upon an upper portion 16b of the internal chamber 16 of the die-head 15.

As shown in FIG. 4, the pressurized gas inlet 45 is connected to an unillustrated second nitrogen gas feeder, serving as second gas-pressurizing means, located outside the die-head 15 through an axial bore 44a formed in the piston 44 along its axis.

In the present embodiment, the second gas-pressurizing means is provided separately from the first gas-pressurizing means for discharging a liquid crystalline polymer from the reactor. However, the first gas-pressurizing means may also serve as the second gas-pressurizing means. In this case, there must be provided a 3-way valve for selectively supplying nitrogen gas to two feed lines and controlling the timing of supply of nitrogen gas and a controller for controlling the timing of changeover operation of the 3-way valve and the timing of start/stop of supply of nitrogen gas.

Next will be described a method for continuous production of a liquid crystalline polymer using the apparatus 40 for batch production (see Table 2).

The method for continuous production of a liquid crystalline polymer is similar to that of Example 1 except material for production of a liquid crystalline polymer and a process for discharging a produced liquid crystalline polymer. Only this process for discharge will be described below.

When a liquid crystalline polymer is formed, nitrogen gas is supplied into the reactor 11 from the first nitrogen gas feeder so as to apply pressure to the liquid crystalline polymer. The slit valve 20 and the discharge valve 43 located at a bottom portion of the reactor 11 are opened, thereby discharging the liquid crystalline polymer under pressure through the die-head 15 and the die-plate 27, in the form of strands. These strands are pelletized. As mentioned previously, the sequence of opening the slit valve 20 and the discharge valve 43 is not particularly limited. For example, (1) the slit valve 20 is first opened, and then the discharge valve 43 is opened, (2) the discharge valve 43 is first opened, and then the slit valve 20 is opened, or (3) the slit valve 20 and the discharge valve 43 are opened substantially concurrently. When the withstand pressure of the slit valve 20 is low, method (1) or (3) is preferred.

After almost all the liquid crystalline polymer is discharged from the reactor 11, while nitrogen gas is allowed to keep flowing out through the die-head 15 and the die holes 30 formed in the die-plate 27; i.e., while nitrogen gas purge is continued, the slit valve 20 and the discharge valve 43 are closed, thereby ending discharge of the liquid crystalline polymer from the reactor 11. Again, the sequence of closing the slit valve 20 and the discharge valve 43 is not particularly limited.

Immediately after the discharge valve 43 is closed, production of the second batch of liquid crystalline polymer is started within the reactor 11. Specifically, as in the case of production of the first batch, a predetermined material for production of the liquid crystalline polymer is charged into the reactor 11. Removal of acetic acid, temperature control, and reduction of pressure are started in a manner similar to that in production of the first batch.

As described above, when almost all the liquid crystalline polymer is discharged from the reactor 11, while nitrogen gas purge is continued, the discharge valve 43 is closed, followed by immediate start of production of the second batch of liquid crystalline polymer within the reactor 11. Accordingly, production efficiency is improved greatly as compared with the conventional method involving cleaning and drying of the reactor. As compared with the case in which, after almost all a liquid crystalline polymer is discharged from the reactor 11, nitrogen gas purge is successively continued so as to discharge remaining liquid crystalline polymer from the reactor 11, the die-head 15 and the holes 30 formed in the die-plate 27, and then the discharge valve 13 is closed, followed by start of production of the second batch (Example 1), the present Example 3 features a great reduction in the period of time between end of discharge of the first batch and start of production of the second batch, thereby further improving production efficiency.

At the same time of starting production of the second batch of liquid crystalline polymer in the reactor 11, the die-head 15 is allowed to stand for, for example, about 30 minutes after completion of discharge of the liquid crystalline polymer from the reactor 11 and then pressurized nitrogen gas from the second nitrogen gas feeder is supplied into the upper portion 16b of the internal chamber 16 of the die-head 15 through the pressurized gas inlet 45 to keep the internal chamber 16 under pressure. Then the slit valve 20 is opened so as to discharge residual liquid crystalline polymer present on the wall of the internal chamber 16 of the die-head 15 and within the slit valve 20. Subsequently, after discharge of residual liquid crystalline polymer, while nitrogen gas is kept flowing out through the die holes 30 formed in the die-plate 27; i.e., while nitrogen gas purge of the die-head 15 is continued, the slit valve 20 is closed again, thereby ending discharge of residual liquid crystalline polymer from the die-head 15.

While the die-head 15 is allowed to stand for, for example, about 30 minutes after completion of discharge of the liquid crystalline polymer from the reactor 11, residual liquid crystalline polymer present on an upper portion of the internal chamber 16 moves downward by its own weight. Further, while pressurized nitrogen gas introduced into an upper portion of the internal chamber 16 is kept flowing out through the die holes 30 formed in the die-plate 27; i.e., while nitrogen gas purge is continued, the slit valve 20 is close. Thus, the flowing nitrogen gas causes discharge through the die holes 30 formed in the die-plate 27 of residual liquid crystalline polymer present on a narrow portion of the flow path in the die-head 15 and on the inner wall of the die-head 15. Therefore, the amount of residual liquid crystalline polymer present within the die-head 15 and within the slit valve 20 can be decreased greatly.

Since discharge of residual liquid crystalline polymer from the die-head 15 ends by closing again the slit valve 20, the die-head 15 is filled with nitrogen gas, thereby shutting off the interior of the die-head 15 from the outside air. Thus, even when some liquid crystalline polymer still remains within the die-head 15, the residual liquid crystalline polymer is free from oxidation or deterioration, such as discoloration or carbonization.

After the elapse of a predetermined period of time, the second batch of liquid crystalline polymer is formed. Again, while nitrogen gas is supplied into the reactor 11 from the first nitrogen gas feeder so as to apply pressure to the liquid crystalline polymer contained in the reactor 11, the slit valve 20 and the discharge valve 43 are opened, thereby starting discharge of the liquid crystalline polymer through the die-head 15 and the die-plate 27.

Material for production of a liquid crystalline polymer used in Example 1 was also used in Example 3.

A series of operations described above-a process for discharging a liquid crystalline polymer from the reactor 11, a process for ending discharge of a liquid crystalline polymer from the reactor 11, a process for ending discharge of a liquid crystalline polymer from the die-head 15, and a process for starting discharge of a liquid crystalline polymer from the reactor 11 was repeated by a predetermined number of times (3 times). The yield of pellets was 97.9%, and the number of BS's was an average of 2.9.

Comparative Example 4

A liquid crystalline polymer was produced in a manner similar to that of Example 3 except that the conventional apparatus, which is not equipped with a slit valve, shown in FIG. 5 was used and that nitrogen gas purge was not carried out.

The yield of pellets was 94.7%, and the number of BS's was an average of 11.5.

As seen from comparison of test results between Example 3, which employed the method and apparatus of the present invention, and Comparative example 4, which employed the conventional method and apparatus, the method and apparatus of the present invention do not involve oxidation or deterioration of residual liquid crystalline polymer present in the die-head and bring a great improvement in yield of liquid crystalline polymer. These effects are yielded by virtue of the following features of the present invention: nitrogen gas purge from the die-head 15 is carried so as to minimize residual liquid crystalline polymer present in the die-head; and the slit valve and the discharge valve are closed so as to fill the die-head with nitrogen gas against entry of the outside air into the die-head.

TABLE 2

Comparison of Production between Apparatus Equipped with Slit Valve and Pressurized Gas Inlet and Conventional Apparatus

| | | Conditions of Production | | Yield and Quality | |
|---|---|---|---|---|---|
| | | State of slit valve during | | | |
| | Polymer | interval between discharges | Nitrogen gas purge | Yield (%) | BS |
| Example 3 | B | Opened and then closed | Yes | 97.9 | 2.9 |
| Comparative example 4 | B | Slit valve not provided | No | 94.7 | 11.5 |

What is claimed is:

1. A batch type apparatus for producing a liquid crystalline polymer, comprising:
   a reactor for producing a liquid crystalline polymer capable of forming an anisotropic melt phase, the reactor having a discharge port at a lower portion thereof;
   a first gas-pressurizing means attached to the reactor for discharging under pressure the liquid crystalline polymer by use of an inert gas;
   a die-head including, at one end portion thereof, a discharge valve which opens and closes the discharge port; at a middle portion thereof, an internal chamber which communicates with the discharge port and is heated and regulated from the peripheral surface thereof; and at the other end portion thereof, an opening which forms an end portion of the internal chamber;
   a shut-off valve connected to the other end portion of the die-head and capable of opening and closing the opening; and
   a die-plate disposed at the opening of the shut-off valve.

2. The batch type apparatus according to claim 1, wherein the shut-off valve is a slit valve which has a plurality of holes capable of establishing communication between the opening side and the die-plate side and which shuts off the opening side from the atmospheric air when closed.

3. The batch type apparatus according to claim 1, wherein the die-head has a pressurized gas inlet at an upper portion of the internal chamber and the pressurized gas inlet is connected to a second gas-pressurizing means which supplies an inert gas.

4. A method for continuously producing a liquid crystalline polymer using the batch type apparatus according to claim 1, the method comprising the steps of:
   opening the shut-off valve and the discharge valve after completion of formation of the liquid crystalline polymer in the reactor, and discharging the polymer outward via the die-head and the die-plate, while pressurizing the polymer in the reactor by use of the inert gas fed from the first gas-pressurizing means;
   conducting an operation for stopping discharge of the liquid crystalline polymer, after completion of discharge of the liquid crystalline polymer, so as to close the shut-off valve and the discharge valve while discharging the inert gas;

when a predetermined period of time has elapsed and a liquid crystalline polymer formed in the next batch is to be discharged, opening again the shut-off valve and the discharge valve, while pressurizing the polymer in the reactor by use of the inert gas fed from the first gas-pressurizing means, to thereby conduct an operation for starting discharge of the polymer outward through the die-head and the die-plate; and repeating, for a prescribed number of times, the above-mentioned series of operations for discharging of the polymer, stopping discharge of the polymer, and starting discharge of the polymer.

5. A method for continuously producing a liquid crystalline polymer using the batch type apparatus according to claim 3, the method comprising the steps of:

opening the shut-off valve and the discharge valve after completion of formation of the liquid crystalline polymer in the reactor, and discharging the polymer outward via the die-head and the die-plate, while pressurizing the polymer in the reactor by use of the inert gas fed from the first gas-pressurizing means;

conducting an operation for stopping discharge of the liquid crystalline polymer, after completion of discharge of the liquid crystalline polymer from the reactor, so as to close the shut-off valve and the discharge valve while discharging the inert gas;

starting formation of a liquid crystalline polymer of the next batch in the reactor after the discharge valve is closed, and, after elapse of a required period of time, introducing under pressure the inert gas from the second gas-pressurizing means into the internal chamber of the die-head via a gas inlet formed at an upper portion of the internal chamber of the die-head, opening the shut-off valve so as to discharge the polymer in the die-head and the shut-off valve, and then closing again the shut-off valve while discharging the inert gas outward, thereby conducting an operation of stopping discharge of the polymer in the die-head;

when a predetermined period of time has elapsed and a liquid crystalline polymer formed in the next batch is to be discharged, opening again the shut-off valve and the discharge valve, while pressurizing the polymer in the reactor by use of the inert gas fed from the first gas-pressurizing means, to thereby conduct an operation for starting discharge of the polymer outward through the die-head and the die-plate; and repeating, for a prescribed number of times, the above-mentioned series of operations for discharging of the polymer, stopping discharge of the polymer, stopping discharge of the polymer in the die-head, and starting discharge of the polymer of the next batch.

6. The method for continuous producing according to claim 4 wherein the liquid crystalline polymer is an aromatic polyester resin or an aromatic polyester amide resin.

7. The method for continuous producing according to claim 4 wherein the liquid crystalline polymer is an aromatic polyester amide resin being composed of p-hydroxy benzoic acid, 6-hydroxy-2-naphthoic acid, 4,4'-dihydroxy biphenyl, terephthalic acid, and p-aminophenol, as constitutional monomer components.

8. The method for continuous producing according to claim 4 wherein the liquid crystalline polymer is an aromatic polyester resin being composed of p-hydroxy benzoic acid, and 6-hydroxy-2-naphthoic acid, as constitutional monomer components.

* * * * *